Oct. 25, 1955     H. H. HOADLEY     2,721,715
FLUSH INLET

Filed Sept. 28, 1951     2 Sheets-Sheet 1

INVENTOR
HENRY H. HOADLEY
BY Leonard F. Weklind
ATTORNEY

Oct. 25, 1955 H. H. HOADLEY 2,721,715
FLUSH INLET
Filed Sept. 28, 1951 2 Sheets-Sheet 2

INVENTOR
HENRY H. HOADLEY
BY Leonard F. Welklind
ATTORNEY

United States Patent Office 2,721,715
Patented Oct. 25, 1955

2,721,715

FLUSH INLET

Henry H. Hoadley, Manchester, Conn., assignor, by mesne assignments, to Chance Vought Aircraft, Incorporated, a corporation of Delaware Application September 28, 1951, Serial No. 248,843

6 Claims. (Cl. 244—130)

This invention relates to fluid inlets and more particularly to improvements in flush type inlets for aircraft and the like.

It is an object of this invention to provide a flush inlet for conducting a portion of the fluid flowing over a confining surface such as an aircraft fuselage or a wing whereby efficient and unseparated flow is maintained well into the ducts leading away from the confining surface.

A further object of this invention is to provide a flush inlet of the type described whereby favorable pressure gradients are maintained over the confining surface upstream of the recessed opening of the flush inlet so that improved pressure recovery in the opening is obtained.

Another object of this invention is to provide a flush inlet for an aircraft or the like for inducting a portion of the fluid stream which flows past the external surface thereof and which inlet includes a recessed opening and suction means located adjacent the upstream side of the opening for withdrawing boundary layer flow.

These and other objects of this invention will become readily apparent from the following detail description of the accompanying drawing in which.

The flush inlet of this invention utilizes in part the flow principles taught in Patent No. 2,408,632 issued to A. A. Griffith on October 1, 1946. The adaptation of these principles as a part of this invention will become apparent hereinafter.

Figure 1:
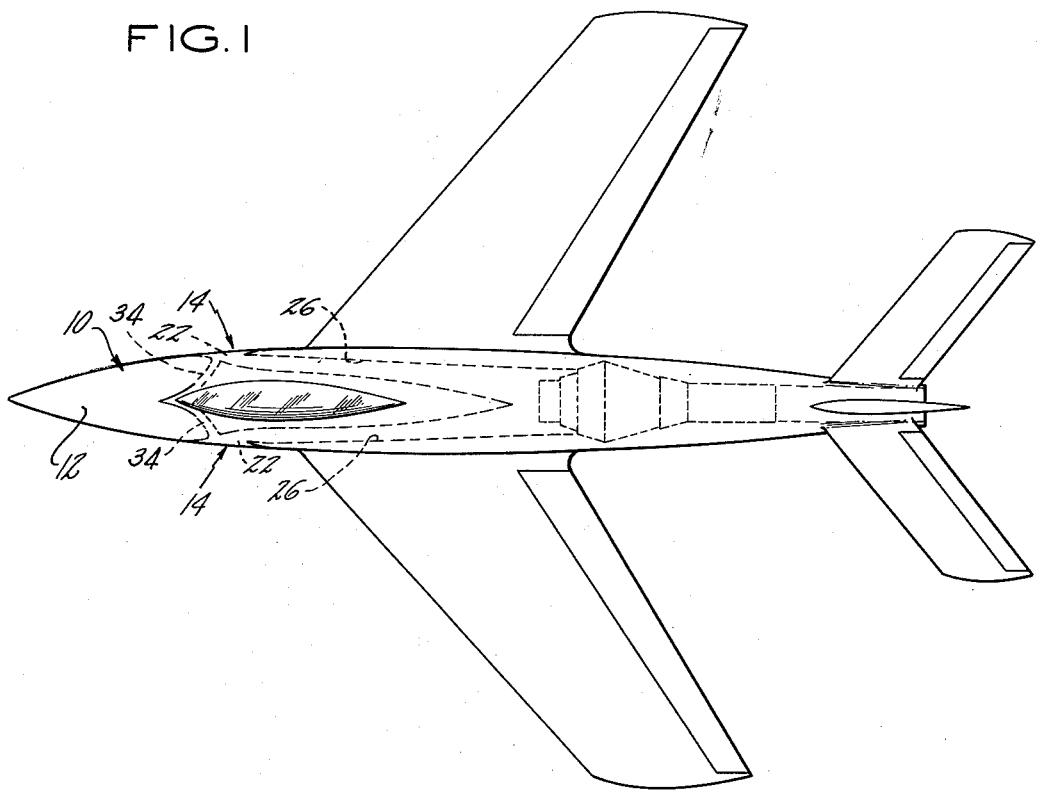
Fig. 1 is a plan view of an aircraft fuselage or similar body having a flush inlet according to this invention.
Figure 2:
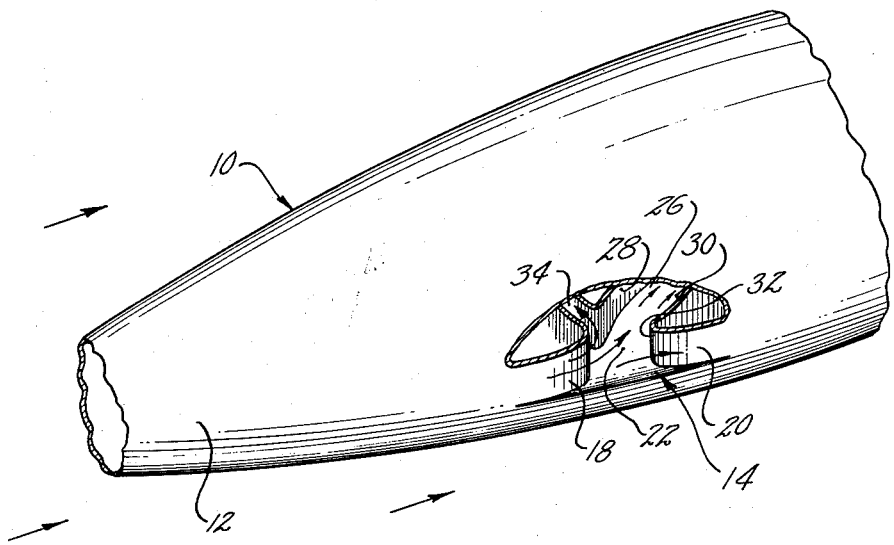
Fig. 2 is a partial cross-sectional view illustrating the inlet of this invention in perspective.
Figure 3:
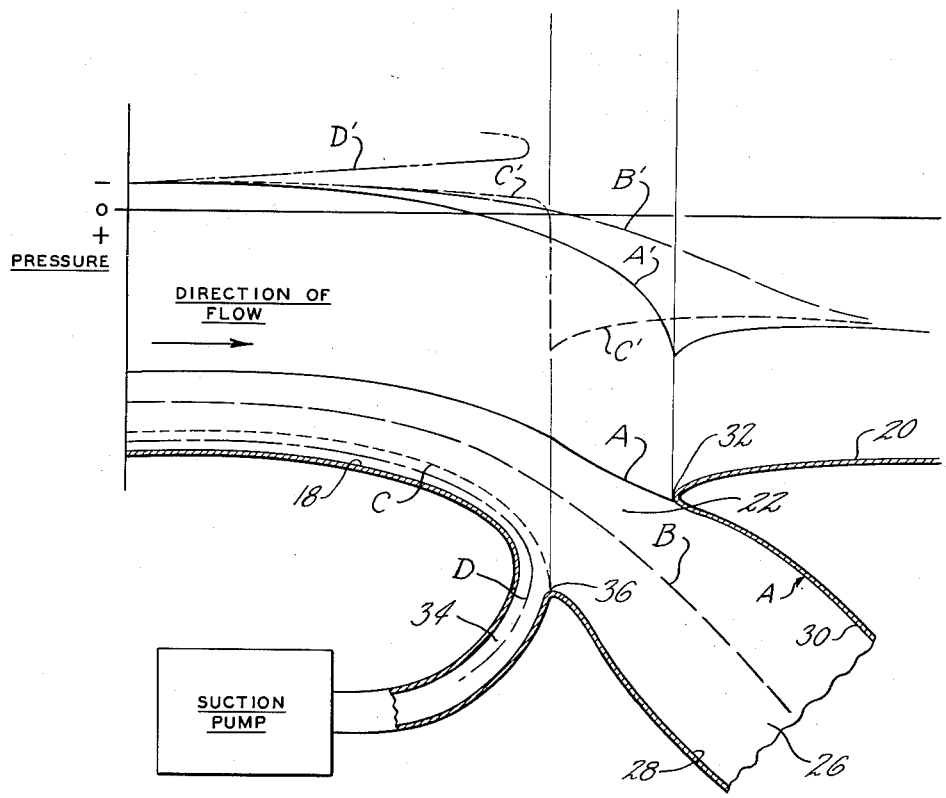
Fig. 3 is a composite illustration of a cross section of the inlet including pressure distribution curves of the fluid flow adjacent the inlet.

Referring to Figs. 1 and 2, a portion of a fuselage 10 is shown having an external fluid confining surface 12 and a flush inlet generally indicated at 14. The flush inlet comprises an upstream surface portion 18 which is generally convex to the flowing stream and a downstream surface portion 20 which is spaced from the upstream portion 18 along the axis of flow thereby defining an opening 22. The surface portions 18 and 20 diverge inboard from the external fuselage surface 12 so that the opening 22 is recessed relative to the latter. A duct 26 communicates with the opening 22 and comprises an upstream wall 28 which is relatively concave to the flowing fluid and a downstream wall portion 30 which merges with the downstream surface portion 20 in a sharply curved lip 32. The upstream wall portion 28 of the duct 26 terminates in spaced relation to the upstream surface portion 18 thereby forming a slot 34 therebetween to which suction can be applied, as for instance by a suction pump (Fig. 3) so as to draw off boundary layer flow which is moving downstream over the surface 18.

As described in the above-referenced patent, the upstream surface portion 18 can be of such a contour that the boundary layer will be moving against a favorable pressure gradient, i. e., a pressure gradient which is at least zero along the axis of flow and preferably a decreasing pressure gradient. However, the stream line for the boundary layer flow and the pressure curve therefor are shown at D and D', respectively, in Fig. 3. Under these conditions then the boundary layer which is moving against a favorable rather than an unfavorable pressure gradient will tend to remain unseparated so that efficient fluid flow is maintained through the opening 22 and into the duct 26.

As illustrated herein, the stream flow immediately above the boundary layer (stream line C) may have a zero or slightly positive pressure gradient (line C') up to the point where its stagnation point is reached at 36 where the upstream wall 28 of the duct merges with the suction slot 34 in a sharply curved surface. As illustrated by line C', the pressure for stream line C will increase rapidly at the stagnation point and thereafter decrease while still remaining positive. Hence, at this stagnation point, all, or most of the boundary layer, will be removed and any reasonable adverse surface pressure gradient following the suction slot lip can be tolerated. The stream lines A and B will have increasing pressure in the direction of flow since the diverted air illustrated by these lines A and B is being decelerated to somewhat less than the free stream velocity at the inlet 22. The pressure illustrated by the line A' for the stream line A will reach a stagnation point at the inlet lip 32. Since stagnation occurs at points 32 and 36 the stream lines A and C can be described as thereafter becoming coincident with the walls of the inlet 26, as illustrated.

The efficient diversion and induction of fluid flow through the inlet 22 and into the duct 26 is achieved primarily by maintaining unseparated flow along the upstream surface portion 18 by means of the boundary layer suction as described above.

As a result of this invention it will be apparent that an extremely efficient air inlet has been provided whereby the usual drag of ordinary scoop inlets is eliminated.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a flush inlet leading from a confining surface over which a fluid stream flows, a depression in said surface having an opening spaced inboard from the remainder of said confining surface, the portion of said depression upstream of said opening forming a diverging convex continuation of said confining surface, a duct leading from said opening and forming a concave continuation of said upstream portion, a slot between said convex and concave portions, means for sucking boundary layer flow into said slot whereby fluid separation is eliminated during movement of air over said portions and toward said opening, and means forming a downstream continuation of said depression comprising a surface portion merging with the downstream wall of said duct to form a lip bounding the downstream side of said opening.

2. In a flush inlet for an aircraft, the aircraft having an external surface over which the free airstream flows, a depression in said surface comprising, an upstream portion diverging inwardly from said external surface and defining a convex surface and a downstream portion spaced from said upstream portion forming a re-entrant angle with respect to said external surface, the spacing between said portions forming a recessed inlet opening, a duct leading internally of the aircraft communicating with said opening, the upstream wall of said duct merging discontinuously with said upstream convex surface and forming a slot therebetween, the downstream wall of said duct merging with said downstream portion of said surface, and means for maintaining a favorable or decreasing pressure gradient in the air flow adjacent said external surface along the axis of air flow from a point along said external surface to a point within said duct comprising suction means for drawing off boundary layer flow into said slot.

3. A flush inlet according to claim 2 wherein said downstream portion merges with the downstream wall of said duct to form a sharply curved lip whereby the air flow farther out in the stream follows the general stream lines of said upstream portion and has a pressure which increases comparatively more rapidly than said air flow adjacent said external surface and which decreases abruptly from said lip to a point downstream thereof.

4. In a flush inlet for an aircraft, the aircraft having an external surface over which a free stream is adapted to flow, a depression in said surface substantially tangential to the airflow over the surface comprising an upstream portion diverging inwardly from said external surface, said upstream portion defining a convex surface, and a downstream portion spaced from said upstream portion forming a re-entrant angle with respect to said external surface, the spacing between said portions forming an inlet opening, a duct leading internally of the aircraft communicating with said opening, the upstream wall of said duct defining a concave surface forming a downstream continuation of said convex surface and a downstream wall of said duct forming a highly curved lip with said downstream portion, a slot adjacent the junction of said convex and concave surfaces having curved walls merging with said surfaces, and means for creating a fluid stagnation point at the upstream wall of said duct adjacent said slot and at said lip including mechanism for sucking boundary layer fluid into said slot.

5. In an inlet for an aircraft, the aircraft having an external surface over which a free stream flows, a depression in said surface substantially tangential to the airflow over the surface comprising an upstream inlet portion diverging inwardly from said external surface, said upstream portion defining a convex surface, a downstream portion spaced downstream from said upstream portion and merging with said external surface, the spacing between said portions forming an inlet opening, a duct leading internally of the aircraft communicating with said opening, the upstream wall portion of said duct defining a concave surface forming a downstream continuation of said convex surface and the downstream wall of said duct forming a highly curved lip with said downstream portion, a slot adjacent the junction of said convex and concave surfaces having walls merging with said surfaces, and means for sucking boundary layer flow into said slot from said convex surface.

6. In an air inlet for an aircraft, the aircraft having an external surface over which a free stream flows, a depression in said surface substantially tangential to the airflow over said surface comprising an upstream inlet portion diverging inwardly from said external surface, a downstream inlet portion spaced downstream from said upstream portion and merging with said external surface, the spacing between said portions forming an inlet opening, a duct leading internally of the aircraft having a wall merging with said upstream and downstream portions, a slot in said duct wall adjacent the point of mergence with said upstream portion, and means for sucking boundary layer flow into said slot.

References Cited in the file of this patent
UNITED STATES PATENTS

| | | |
|---|---|---|
| 2,395,513 | Stalker | Feb. 26, 1946 |
| 2,408,632 | Griffith | Oct. 1, 1946 |
| 2,507,611 | Pappas | May 16, 1950 |
| 2,509,890 | Stalker | May 30, 1950 |
| 2,573,834 | Davidson | Nov. 6, 1951 |
| 2,589,945 | Leduc | Mar. 18, 1952 |